United States Patent [19]

Harrington

[11] Patent Number: 5,319,473
[45] Date of Patent: Jun. 7, 1994

[54] METHODS AND APPARATUS FOR PERFORMING REAL TIME COLOR GAMUT COMPRESSIONS

[75] Inventor: Steven J. Harrington, Holley, N.Y.
[73] Assignee: Xerox Corporation, Stamford, Conn.
[21] Appl. No.: 799,244
[22] Filed: Nov. 27, 1991
[51] Int. Cl.$^5$ ............................................. H04N 1/46
[52] U.S. Cl. .................................. 358/501; 358/519; 358/522; 358/523; 358/518
[58] Field of Search ..................... 358/76, 75, 80, 501, 358/518, 519, 522, 523, 524, 530; H04N 1/46

[56] References Cited

U.S. PATENT DOCUMENTS

| | | | |
|---|---|---|---|
| 4,670,780 | 6/1987 | McManus et al. | 358/80 |
| 4,707,727 | 11/1987 | Penney | 358/80 |
| 4,731,662 | 3/1988 | Udagawa et al. | 358/75 |
| 4,758,885 | 7/1988 | Sasaki et al. | 358/80 |
| 4,843,379 | 6/1989 | Stansfield | 358/80 |
| 4,873,570 | 10/1989 | Suzuki et al. | 358/80 |
| 4,985,759 | 1/1991 | Ito | 358/75 |
| 4,985,853 | 1/1991 | Taylor et al. | 358/80 |
| 5,185,661 | 2/1993 | Ng | 358/75 |
| 5,208,911 | 5/1993 | Newman | 358/518 |
| 5,239,370 | 8/1993 | Yamaguchi | 358/518 |
| 5,268,753 | 12/1993 | Yamaguchi | 358/527 |

OTHER PUBLICATIONS

Stone et al., "Color Gamut Mapping and the Printing of Digital Color Images," ACM Transactions on Graphics, vol. 7, No. 4, pp. 249-292 (Oct. 1988).
Stone et al., "Color Gamut Mapping and the Printing of Digital Color Images," Xerox report EDL-88-1 [P88-00021], pp. 1-52 (Apr., 1988).
Gordon et al., "On the Rendition of Unprintable Colors," Proceedings of the Technical Association of the Graphic Arts, pp. 186-195 (1987).
P. Laihanen, "Optimization of Digital Color Reproduction on the Basis of Visual Assessment of Reproduced Images," Proceedings of the SID, vol. 30, No. 3, pp. 183-190 (1989).
P. Laihanen, "Colour Reproduction Theory Based on the Principles of Colour Science," Advances in Printing Science and Technology, Jun. 1987 Conference, Pantech Press, London (1988).
Harrington et al., "Interpress: The Source Book," Simon & Schuster, New York (1988) (only cover and title pages submitted).
"Interpress Electronic Printing Standard," XNSS 048601, Xerox Corporation (1986) (only cover and title pages submitted).
"Postscript Language Reference Manual," Abode Systems, Inc., Mass. (1990) (only cover and title pages submitted).
"Xerox Color Encoding Standard," XNSS 288811, Xerox Corporation (1989) (only cover and title pages submitted).

Primary Examiner—Mark R. Powell
Assistant Examiner—Jerome Grant, III
Attorney, Agent, or Firm—Finnegan, Henderson, Farabow, Garrett & Dunner

[57] ABSTRACT

An apparatus and method for performing real time color gamut compressions for a source image. The method is performed in a data processing system having a memory, and includes the steps, performed by the data processing system, of storing, in the memory of the data processing system, a multi-pixel image to be output by an image output device, the multi-pixel image having colors of a first color gamut and the image output device being capable of outputting colors of a second color gamut, reading the multi-pixel image from the memory for receipt by the image output device, and converting colors of the multi-pixel image that are not in the second color gamut, after start of the reading step and before completion of the reading step, into colors of the second color gamut.

20 Claims, 8 Drawing Sheets

FIG. 7

| H, Y INDEX | INDEX TABLE |
|---|---|
| $H_1, Y_1$ | $1_{e3}$ |
| $H_1, Y_2$ | $1_{e2}$ |
| $H_2, Y_1$ | $1_{e4}$ |
| $H_2, Y_2$ | $1_{e5}$ |

FIG. 9

| H, Y INDEX | COLOR MAPPING TABLE |
|---|---|
| $H_1, Y_1$ | $F[H_1, Y_1]$ |
| $H_1, Y_2$ | $F[H_1, Y_2]$ |
| $H_2, Y_1$ | $F[H_2, Y_1]$ |
| $H_2, Y_2$ | $F[H_2, Y_2]$ |

FIG. 11

| H, W INDEX | COLOR MAPPING TABLE |
|---|---|
| $H_1, W_1$ | $F[H_1, W_1]$ |
| $H_1, W_2$ | $F[H_1, W_2]$ |
| $H_2, W_1$ | $F[H_2, W_1]$ |
| $H_2, W_2$ | $F[H_2, W_2]$ |

METHODS AND APPARATUS FOR PERFORMING REAL TIME COLOR GAMUT COMPRESSIONS

BACKGROUND OF THE INVENTION

1. Field of the Invention

The present invention relates to the performance of color gamut compressions in an apparatus such as a color printer device. More particularly, the present Invention relates to a color printer device wherein a color Image to be printed is analyzed at the same time it is being stored, and the color gamut of the image is compressed at the same time it is being removed from storage for printing, so that the color image can be analyzed and compressed in real time.

2. Discussion of the Related Art

Color printers that can be used for producing color reproductions of original and color images are known. Methods and apparatus relating to color image reproduction are described in, for example, U.S. Pat. Nos. 4,670,780, 4,707,727, 4,731,662, and 4,873,570, all of which are expressly incorporated herein by reference. The following articles, which relate to color image reproductions, are also expressly incorporated herein by reference: Stone et al., "Color Gamut Mapping and the Printing of Digital Color Images," ACM Transactions on Graphics, Vol. 7, No. 4, pp. 249-292 (October 1988); Stone et al., "Color Gamut Mapping and the Printing of Digital Color Images," Xerox Report EDL-88-1 [P88-00021], pp. 1-52 (April 1988); and Gordon et al., "On the Rendition of Unprintable Colors," Proceedings of the Technical Association of the Graphic Arts, pp. 186-195 (1987).

A color printer is limited in the range of colors it can reproduce. Thus, a source image (i.e., an original image) to be printed by the color printer may include colors that the printer is not able to reproduce. This in particularly true of color images created for a CRT (cathode-ray tube) monitor because the color gamut available to a CRT is typically much larger than the color gamut of a color printer. Consequently, it is often the case that the colors of the source image gamut must be mapped into the colors of the printer gamut (i.e., the colors which the printer is capable of producing) before any printing can be carried out. This process is called "gamut compression," because it involves compressing the color gamut of the source image until it fits within the color gamut of the printer.

A method of mapping the colors of a source image into the producible colors of a printer gamut (i.e., a method of compressing the source image gamut) is disclosed in U.S. Pat. No, 4,758,885, which is expressly incorporated herein by reference. In the '885 patent, the source image gamut of a monitor is shrunk so that it will fit within the printer gamut. However, in the '885 patent, the gamut of every source image is shrunk or compressed in the same way. Even if the source image only contains colors that the printer is capable of printing, the colors in the source image gamut are still mapped (i.e., the source image gamut is still compressed) before the source image is reproduced. Thus, in the '895 patent, unnecessary distortions and changes are introduced to the source image in situations where the original source image gamut does not need to be compressed in order to fit within the printer gamut.

Rather than compressing each source image in the same way, it is preferable to determine a different mapping or compression scheme for each source image so that unnecessary distortion of the source image can be kept to a minimum. For example, if all of the colors of a source image gamut are within the printer gamut, then the source image should not be mapped (i.e., the color gamut of the source image should not be compressed). This approach is suggested in the Stone et al. articles incorporated by reference above. Nevertheless, the methods described in the Stone et al. articles require sophisticated human analysis of the source image and printer gamuts.

The need for sophisticated human analysis can be eliminated by carrying out the gamut compression automatically, as described in the following articles by P. Laihanen, both of which are expressly incorporated herein by reference: "Optimization of Digital Color Reproduction on the Basis of Visual Assessment of Reproduced Images," Proceedings of the SID, Vol. 30, No. 3, pp. 183-190 (1969), and "Colour Reproduction Theory Based on the Principles of Colour Science," Advances in Printing Science and Technology, June 1987 Conference, Pantech Press, London (1988). While the Laihanen articles contemplate the automatic compression of color gamuts, they do not address techniques for performing gamut compressions in real time. The '885 patent, which was discussed above, suffers from the came drawback. That is, the colors described in the '885 patent are not intended for use in perfoming real time adjustments to, or compressions of, the color gamuts of a variety of source images.

Adjusting the gamut of a source image to fit within the printer gamut is generally a two-stage process. A conventional device for performing such gamut adjustment or compression is shown in FIG. 1.

With reference to FIG. 1, an image buffer 13 generally receives a source image (e.g., a color image) from an image input device 11 and then stores the image until it is operated on by gamut compression circuitry 17. The image input device 11 may be an input for a color monitor, while the image buffer 13 may be a RAM (random access memory) having memory locations corresponding to the pixels of the source image input by the image input device 11. At each memory location in the image buffer 13, color information for a given pixel of the source image is stored.

In FIG. 1, the gamut compression circuitry 17 performs a two-stage gamut compression process. The first stage of the gamut compression process entails an examination of the color of each pixel of the source image stored in the image buffer 13 for the purpose of determining the boundary of the source image gamut. The second stage of the process, performed after the source image gamut has been compared with the printer gamut, involves altering the color value of each pixel stored in the image buffer 13 so as to bring the colors of the source image stored in the image buffer within the printer gamut.

In the gamut compression process performed by the system shown in FIG. 1, the color of each image pixel stored in the image buffer 13 must be considered twice: a first time for analyzing the boundary of the source image gamut, and a second time for mapping or altering the color of each pixel of the source image in order to compress the source image gamut. After the colors of the source image stored in the image buffer 13 have been mapped in this fashion (i.e., after the source image gamut has been compressed to fit within the printer gamut), the image is output from the Image buffer 13 to an image output device 15 (e.g., a color printer), FIG. 2 is similar to FIG. 1 in that it shows a conventional color printing system in which colors of a image are considered twice. However, in the system shown in FIG. 2( gamut compressions are not performed, because source image colors which cannot be printed by the printer system are never input into the system. Unprintable source image colors are never input to the printer system of FIG. 2 because this type of printer system does not allow an operator (e.g., a human operator) using the printer system to input colors which the image output device 25 is not capable of printing.

A color image having a sophisticated image description can be described by using existing page description languages such as those discussed in the following publications, all of which are expressly incorporated herein by reference: S. Harrington et al., "Interpress: The Source Book," Simon & Schuster, New York (1988); "Interpress Electronic Printing Standard," XNSS 049601, Xerox Corporation (1986), and "Postscript Language Reference Manual," Adobe Systems, Inc., Mass, (1990). These languages can be used in a system such as the printer system shown in FIG. 2.

In the system shown in FIG. 2, a color image is constructed or built within an image buffer 23 from a number of simple image Primitives (also called picture elements) such as lines and/or characters. The construction of the source image in the image buffer 23 is carried out by an image primitive generator 21. The image primitive generator 21 assembles or constructs the color image by collecting various primitives within the image buffer 23. Once the construction of the color image within the image buffer 23 is completed, the contents of tho image buffer 23 are forwarded to an image output device 25 so that the constructed color image can be printed. The colors of the source image are considered twice: a first time when the primitives are entered into the image buffer and a second time when the contents of the image buffer are printed.

The printer system shown in FIG. 2 is limited in that an operator using the image primitive generator 21 may only generate primitives for storage in the image buffer 23 that have colors which the image output device 25 is capable of producing. Thus, the printer system of FIG. 2 does not require gamut compression circuitry because the source image gamut stored in the image buffer 13 is always within the printer gamut (i.e., the gamut of image output device 25). Further, because the image printer system shown in FIG. 2 uses only input primitives having colors within the color gamut of the image output device 25, the storage capacity of the image buffer 23 is such that the image buffer 23 only represents or stores those colors included within the printer gamut.

A drawback associated with the conventional printer system shown in FIG. 1 is that the source image gamut cannot be determined in real time (i.e., at the same time the source image is being input into the image buffer 13) or compressed in real time (i.e., at the same time the source image in being read from the image buffer 13). Instead, the source image gamut is determined by the gamut compression circuitry 17 only after the source image has been stored in the image buffer 13. Similarly, the source image is read out from the image buffer 13 only after the gamut of the source image has been compressed.

The printer system of FIG. 2 also has a drawback. In the printer system of FIG. 2, the selection of source image colors available to the operator as the operator is constructing the source image is limited by the characteristics of the image output device 25 and the image buffer 23. In other words, the source image constructed by the operator in the image buffer 23 may only be composed of colors which can be represented in the image buffer 23 and reproduced by the image output device 25.

SUMMARY OF THE INVENTION

The present invention has been made in view of the above circumstances and, in accordance with one aspect of the present invention., an arrangement is provided that is capable of performing real time color gamut compressions for a source image at the same time the source image is being read out from a memory to an image output device such as a printer.

In accordance with another aspect of the present invention, an arrangement is provided wherein source image gamut compressions are performed simply and efficiently by modifying the source image using gamut compression factors that are indexed by hue-related values indicating hue characteristics of the source image. The soured image gamut compressions can be further simplified by representing the values of tho source image in the YES coordinate system, and by using logarithmic values to indicate saturation characteristics of the source image, and gamut compression factors applied to the source image.

Additional features and advantages of the invention will be mot forth in part in the description which follows and in part will be obvious from the description, or may be learned by practice of the invention. The features and advantages of the invention may be realized and attained by means of the instrumentalities and combinations particularly pointed out in the appended claims.

As embodied and broadly described herein, an image processing method of the present invention, performed by a data processing system having a memory, comprises the steps,, performed by the data processing system, of storing, in the memory of the data processing system, a multi-pixel image to be output by an image output device, the multi-pixel image having colors of a first color gamut and the image output device being capable of outputting colors of a second color gamut; reading the multi-pixel image from the memory for receipt by the image output device; and converting colors of the multi-pixel image that are not in the second color gamut, after start of the reading step and before completion of the reading step, into colors of the second color gamut.

Another embodiment of the image processing method of the present invention, performed by a data processing method having a memory, comprises the steps, performed by the data processing system, of storing, in the memory of the data processing system, a multi-pixel image to ba output by an image output device, the multi-pixel image having colors of a first color gamut and the image output device being capable of outputting colors of a second color gamut; constructing a color mapping table in the memory that includes a list of gamut compression factors representing differences between the first and second color gamuts; and modifying the multi-pixel image stored in the memory in accordance with the gamut compression factors in the color mapping table.

In addition to the foregoing embodiments, the present invention also comprises apparatus for performing the methods.

BRIEF DESCRIPTION OF THE DRAWINGS

The accompanying drawings, which are incorporated in and constitute a part of this specification,, illustrate embodiments of the invention and, together with the description, serve to explain the objects, advantages and principles of the invention. In the drawings:

FIG. 7 is a portion of an index table including only a maximum saturation value for each H, Y index;

FIG. 9 is portion of a color mapping table that has been constructed using cylindrical geometry coordinates;

FIG. 11 is a portion of a color mapping table that has been constructed using spherical geometry coordinates.

DETAILED DESCRIPTION OF THE EMBODIMENTS

Figure 3:
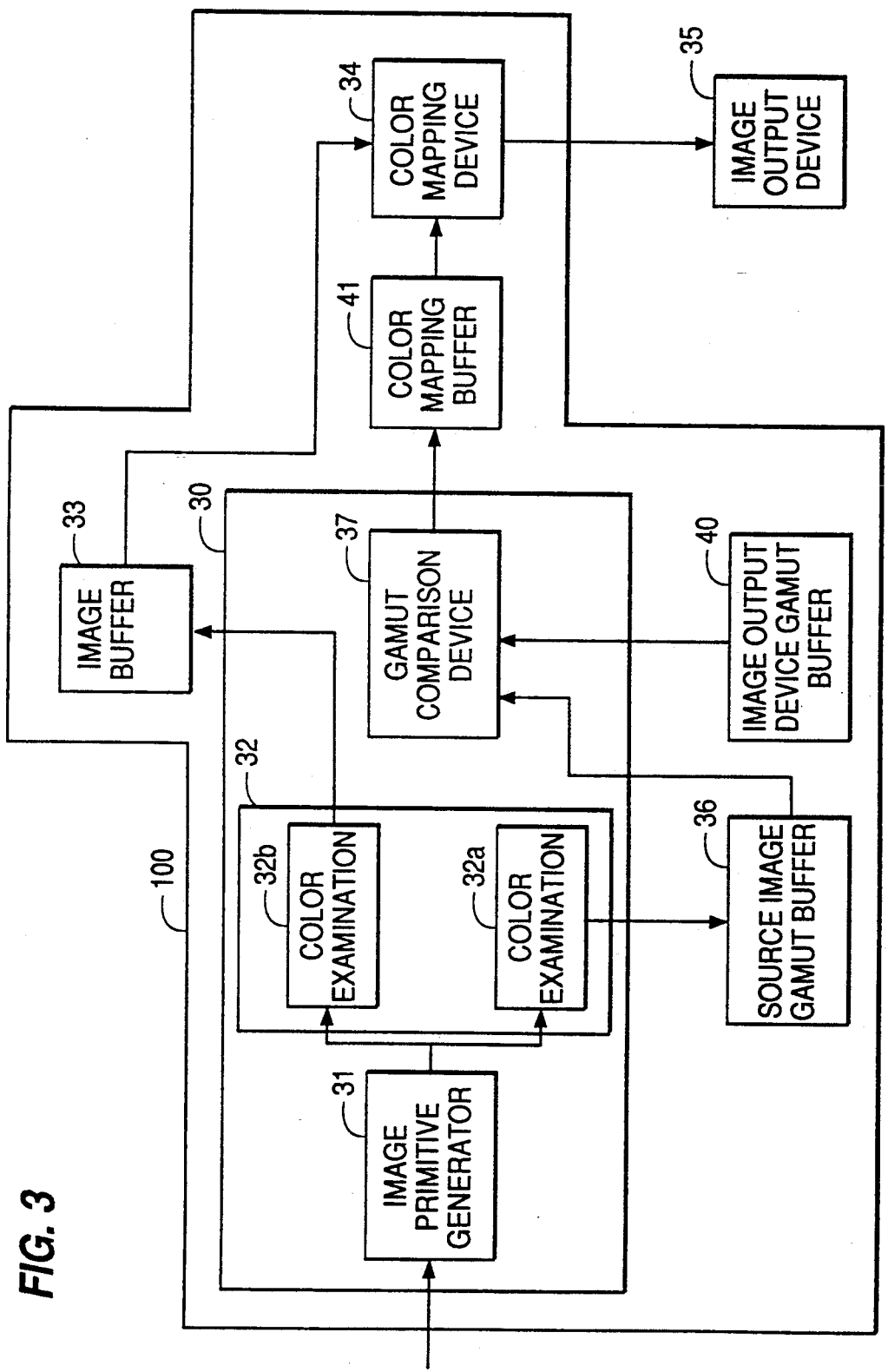
FIG. 3 is a block diagram of a color image reproduction system including an image processing apparatus in accordance with an embodiment of the present invention.
Figure 4:
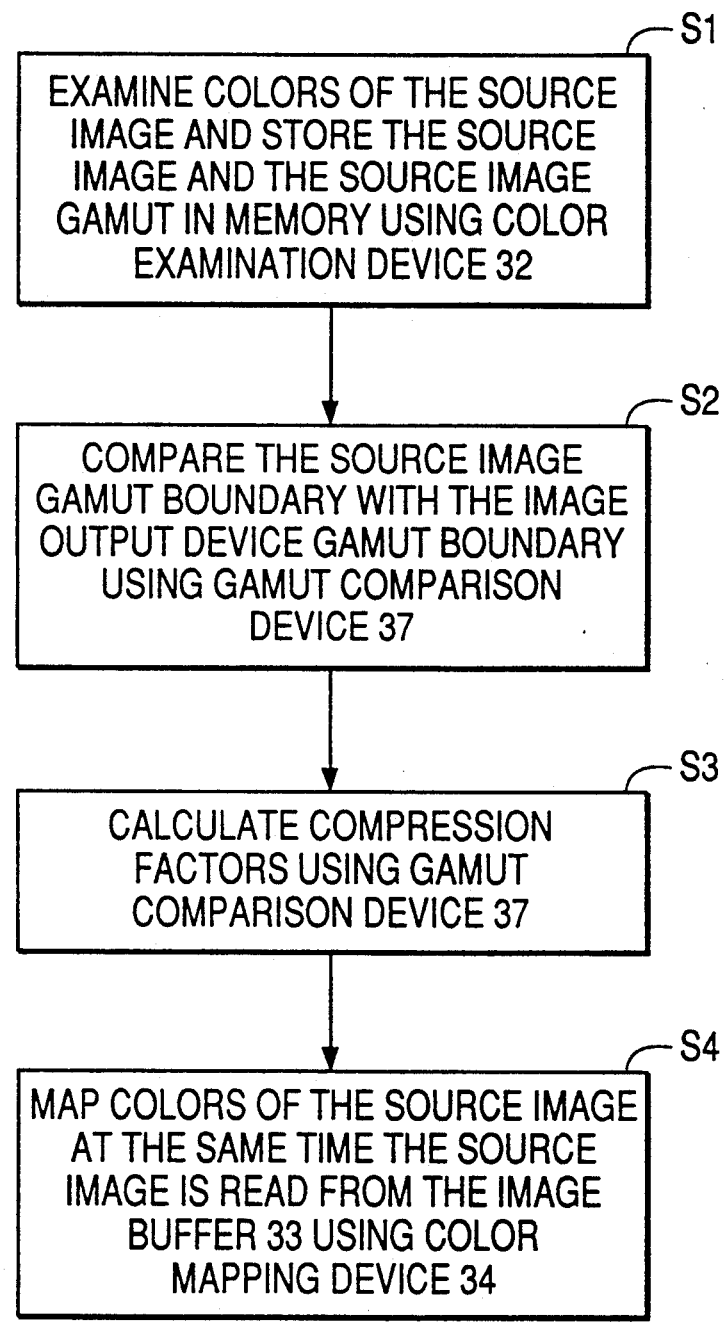
FIG. 4 is a flow chart illustrating a method performed by the image processing apparatus illustrated in FIG. 3.

FIG. 3 shows an apparatus for providing printed color images in accordance with an embodiment of the present invention. A flow chart representing a gamut compression process performed by the apparatus of FIG. 3 is shown in FIG. 4.

The gamut compression process performed by the apparatus of FIG. 3 is a two-stage process. The first stage entails analyzing colors of a source image (e.g., determining the boundary of the source image gamut), and the second stage involves mapping or altering colors of the source image in order to compress the source image gamut.

The apparatus of FIG. 3 uses two color considerations associated with the construction and printing of the source image to perform the two stages of the gamut compression process. More particularly, a first color consideration (i.e., an examination of the source image so that it can be stored in memory) associated with the construction of the source image is used to determine the color gamut of the source image, and a second color consideration (i.e., an examination of the stored source image so that it can be printed) associated with the printing of the source image is used to compress the source image.

In the apparatus of FIG. 3, a digital processing system 100 includes a main processor 30 (e.g., a CPU) that is operatively is associated with a color mapping device 34, which is preferably an auxiliary processor or hardware chip external to the main processor. In another embodiment of the invention, the functions of the color mapping device 34, discussed in greater detail below, may be performed by the main processor 30 itself rather than by an auxiliary processor or chip separate from the main processor. The main processor 30 and the color napping device 34 interact to compress the color gamut of a source image to be output via an image output device 35, which may be a printer or a display device such as a CRT (cathode ray tube).

As can be seen from FIG. 3, the main processor 30 is operatively associated with an image buffer 33 for storing the source Image, a source image gamut buffer 36 for storing the boundary of the source image gamut (i.e., information representing the boundary of the color gamut of the source image), an image output device gamut buffer 40, and a color mapping buffer 41. Buffers 33, 36, 40 and 41 may be sections of a single random access memory (RAM) included in the digital processing system 100 or, in another embodiment, may be embodied in separate RAMS. In yet another embodiment, the gamut buffer 40 may be a read only memory (ROM) instead of a RAM.

The main processor includes an image primitive generator 31, a color examination device 32, and a gamut comparison device 37. Although the image primitive generator 31, the color examination device 32 and the gamut comparison device 37 are represented as separate elements of the main processor 30 in FIG. 3, it should be understood that these elements are preferably embodied by software stored in a memory (such as a RM, not shown), where the instructions of the software are performed by the main processor 30. The elements of FIG. 3 may also be embodied by analog or digital circuitry for performing the same functions as the software discussed below.

Tho image primitive generator 31 constructs a color source image within the image buffer 33 of the main processor. The image primitive generator 31 constructs the source image from a number of image primitives, such an lines and characters, under the control of an operator (e.g., a human operator). The primitives each comprise one or more pixels, and are output from the image primitive generator 31 one primitive at a time.

The construction performed by the image primitive generator 31 may comprise, for example, building up a source image from "scratch," or adding lines and/or pictures to a predetermined color image output by a scanner or some other image producing device. In another embodiment of the present invention, the image primitive generator may be eliminated, and the signals output by the image primitive generator replaced by the output of a scanner or some other image input device external to the main processor 30, The color examination device 32 examines the colors of the source image output by the image primitive generator 31. More particularly, after the image primitive generator outputs a primitive to be stored in the image buffer 33, the color examination device 32 examines the color of the primitive before the primitive is received by the image buffer. Accordingly, during the course of constructing the source image in the image buffer 33, each primitive output by the image primitive generator 31 is examined by the color examination device 32 before it is stored in the image buffer 33.

As can he seen from the foregoing discussion, the color examination device 32 examines all colors of the source image between the time when the first primitive of the source image in output by the image primitive generator 31 and the time when the last primitive of the source image is stored in the image buffer 33. Thus, it can be said that the color examination device 32 examines or considers colors of the source image at the same time tho source image generated by the image primitive generator 31 is being stored in the image buffer 33 (i.e., after the first primitive of the source image is output by the image primitive generator 31 for receipt by the image buffer 33, but before the last primitive of the source image is stored in the image buffer).

The color examinations performed by the color examination device 32 will now be discussed. As can be seen from FIG. 3, the color examination device 32 includes two color examination sections $32_a$ and $32_b$, each of which examines or analyzes colors of the source image. In particular, the color examination section $32_b$ analyzes the image primitives output by the image primitive generator 31 to determine which pixel locations of the image buffer 33 should be modified to include color information of the source image, and the color information used to perform such modifications (i.e., the color coordinates to be stored in the pixel locations to be modified). The modifications of the storage locations in the image buffer 33 are carried out by the color examination section $32_b$.

The color examination section $32_a$ analyzes the source image to determine the boundary of the color gamut of the source image, and stores the source image gamut boundary (i.e., information representing the boundary of the source image gamut) in the source image gamut buffer 36, Thus, the color examination sections $32_a$ and $32_b$ each examine or analyze the colors of the source image at the same time the source image is being constructed or stored in the image buffer 33. Further, the color examination device $32_a$ stores the boundary of the source image gamut in the source image gamut buffer 36 at the same time the source image in being stored in the image buffer 33 by the color examination section $32_b$.

In the apparatus of FIG. 3, the color examination sections $32_{a\ l\ and\ 32b}$ of the color examination device 32 are included within the main processor 30, and therefore the functions performed by these sections are carried out within the main processor 30. However, in another embodiment of the invention, the function performed by one of these sections may be carried out by auxiliary processors separate from the main processor 30 so that the color examination sections $32_a$ and $32_b$ of the color examination device can operate in parallel. In this case, the color of each primitive of the source image may be examined in parallel by both of the sections $32_a$ and $32_b$ of the color examination device 32. As a further result, the color examination section $32_b$ may store the color coordinates for each source image primitive in the image buffer 33 in parallel with the storing (performed by the color examination section $32_a$) of the gamut information derived from that primitive in the source image gamut buffer 36. Such parallel processing increases the speed at which the source image and the boundary of the source image gamut are stored in the image buffer 33 and the source image gamut buffer 36, respectively.

in another embodiment of the present invention, all of the functions performed by the color examination section $32_a$ may be carried out in parallel using a first set of auxiliary processors located external to the main processor 30, and all of the functions performed by the color examination section $32_b$ may be carried out in parallel using a second set of auxiliary processors located external to the main processor 30. In accordance with this embodiment, for example, the first set of processors may analyze one of the source image primitives and, in parallel, output the color space coordinates of a previously analyzed primitive to the image buffer 33. By using auxiliary sets of processors arranged in a pipeline configuration to perform the functions of the color examination sections $32_a$ and $32_b$, the speed at which the source image and the boundary of the source image gamut are stored In the image buffer 33 and the source image gamut buffer 36, respectively, may be even further increased.

The image buffer 33 may be addressed according to the pixel locations of the source image, so that each storage location in the image buffer holds the color space coordinates for a given one of the source image pixels. Also, the source image gamut buffer 36 may include a color space array composed of storage locations addressed by color, so that each storage location in the source image gamut buffer holds information corresponding to a given one of the colors of the source image gamut. Other addressing schemes may be used to store the source image in the image buffer 33 or to store the source image gamut in the source image gamut buffer 36.

The functions of the gamut comparison device 37 and the color mapping device 34 will now be discussed. Like the main processor 30, the color mapping device 34 includes elements that are preferably embodied by software stored in a memory (not shown), where the instructions of the software are performed by the color mapping device 34. Also, as suggested previously, the elements of the color mapping device 34 may also be embodied by analog circuitry performing the same functions as the software discussed below.

The gamut comparison device 37 is operatively associated with the source image gamut buffer 36, the image output device buffer 40 and the color mapping buffer 41, and the color mapping device 34 is operatively associated with the color mapping buffer 41 and the image buffer 33, The gamut buffer 40 is used for storing information representing the boundary of the color gamut of the image output device 35 (i.e., the boundary of the image output device gamut). Preferably, the gamut buffer 40 Is addressed in the same way as the source image gamut buffer 36, so that the gamut comparison device 37 can more easily compare the boundary of the source image gamut with the boundary of the image output device gamut. If the image output device 35 is replaced by a different image output device, and if the gamut buffer 40 comprises a RAM, then the boundary of the image output device stored in the gamut buffer 40 may be replaced by a now image output device gamut boundary corresponding to the image output device that replaced the image output device 35, The gamut comparison device 37 compares the boundary of the source image gamut stored in the source image gamut buffer 36 to the image output device gamut stored in the gamut buffer 40 to determine, for each color of the source image gamut that does not fall within the image output device gamut, a value representing an amount the unprintable source image color must be mapped or compressed to fall within the printer gamut. Such values will hereinafter be referred to as "compression factors" "squeeze factors."

The gamut comparison device 37 determines the compression factors for the source image, and stores the compression factors in the color mapping buffer 41. Tho color mapping device 34 reads the source image from the image buffer 33 and maps the colors of the source image in accordance with the compression factors stored in the color mapping buffer 41. In particular, the color mapping device 34 uses the gamut compression factors stored in the color mapping table to map the colors of the source image at the same time the source image is being read from the image buffer 33 to the image output device 35 (i.e., after the first pixel of the source image is read from the image buffer for receipt by the image output device and before the lost pixel of the source image is actually received by the image output device 35), so that the colors of the source image fall within the color gamut of the image output device. Upon receipt of the output of the color mapping device 34 (i.e., the gamut-compressed source image), the image output device 35 outputs an image corresponding to the gamut-compressed image. Because the mapped source image applied to the image output device 35 has a compressed color gamut, every color of the image is capable of being reproduced by the image output device 35.

The flow chart of FIG. 4 illustrates the gamut compression method performed by the apparatus of FIG. 3. The steps of FIG. 4 are performed by various ones of the elements of FIG. 3, as has been described. Summarizing the above-described gamut compression process, the color examination device 32 examines the colors of the source image generated by the image primitive generator 31 at the salve time the source image in being stored in the image buffer 33 to determine the boundary of the source image gamut (step S1 of FIG. 4). Thereafter, the gamut comparison device 37 compares the boundary of the source image gamut, which is stored in the source image gamut buffer 39, to the image output device gamut stored in thQ gamut buffer 40 (step S2). Next, the gamut comparison device 37 determines gamut compression factors based on the comparison of the boundaries of the source image gamut and the image output device gamut (stop S3). Then, the color mopping device 34 maps the colors of the source image at the imagee time that the source image is being read from the image buffer 33 (step S4). Like, the color examination sections 32$_a$ and 32$_b$ of the color examination device 32, all of the above-described functions of the gamut comparison device 37 and the color napping device 34 may be carried out using sets of processors external to the main processor 30 and having a pipeline configuration. In this manner, for example, the gamut comparison device 37 can perform all of its functions (such as the comparing of gamut boundaries and the outputting of gamut compression factors to the color mapping buffer 41) in parallel, and the color mapping device 34 can perform all of its functions (such as the mapping of colors and the outputting of the mapped colors to the image output device 35) in parallel.

The apparatus of FIG. 3 has an advantage in that it is capable of performing real time source image gamut determinations and real time source image gamut compressions. Because the source image gamut is examined (i.e., analyzed) at the same tine the source image is being constructed in the image buffer 33, and the mapping of the source image is executed at the same time the source image is read out from the image buffer to the image output device 35, both the time required to perform the source image gamut compression and the number of steps it takes to perform the source image gamut compression are decreased. Furthermore, the apparatus shown in FIG. 3 allows the operator greater design flexibility by increasing the numbers of colors available to the operator for use in the construction of the source image in the image buffer 33. Additionally, the apparatus of FIG. 3 is advantageous because it only compresses the source image gamuts which require compressing, whereas conventional systems compress the color gamut of the source image regardless of whether such compression is necessary.

Figure 1:
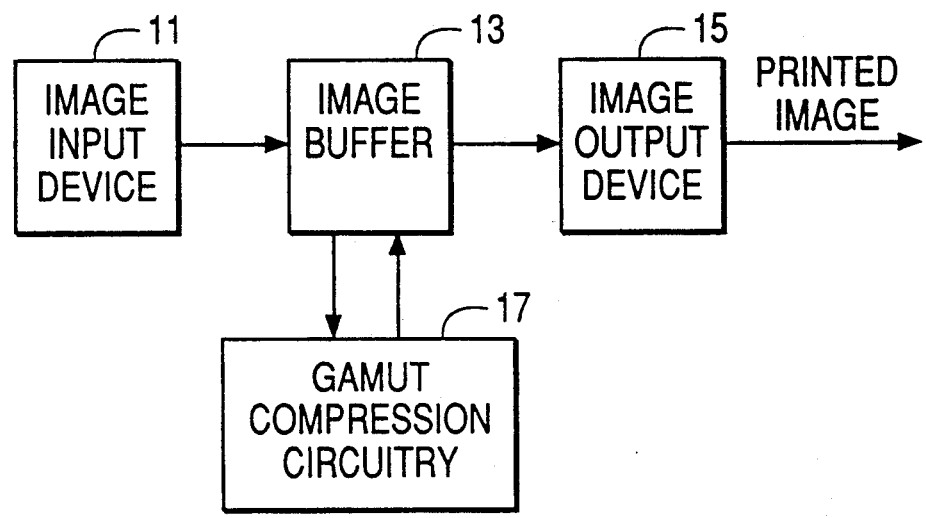
FIG. 1 is a block diagram of a conventional color image printing system.
Figure 2:
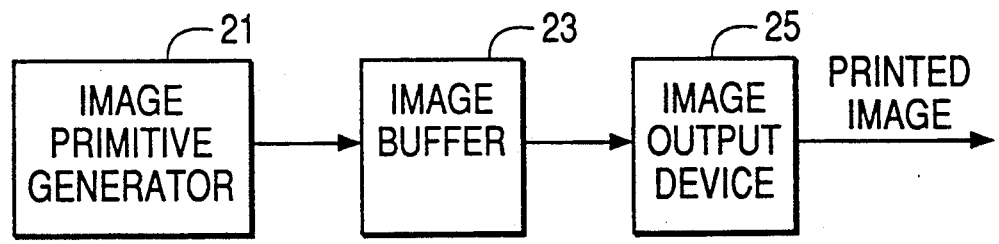
FIG. 2 is a block diagram of another conventional color image printing system.

In the apparatus of FIG. 3, the image buffer 33 must be "broad" enough to store nearly all potential source image colors, because the source image gamut is not compressed until after the source Image is stored. Thus, the described embodiment is different from the conventional system shown in FIG. 2, wherein the image buffer 23 only represents colors within the image output device gamut. Broadening the image buffer 33 to include nearly all of the potential source image colors means that either the memory capacity of the image buffer 33 must be increased so that it can accommodate more bits at each pixel location, or that fewer color levels will be assigned to the image output device gamut, and that some color accuracy will be lost. The affective loss of color accuracy can be reduced, however, by using a nonlinear scale to represent the color space coordinates stared in the image buffer 33, such that the steps or intervals between the color space coordinates outside of the image output device gamut are larger than those within the interior of the image output device gamut.

As indicated previously, the image primitive generator 31 is used by a human operator to construct a color source image within the image buffer 33. Tho colors of the primitives output by the image primitive generator 31 may be represented in either the RGB color coordinate system, or the CIE XYZ color coordinate system, both of which are well known. Other well known color coordinate systems may also be used to represent the various colors of the source image.

The analysis and gamut compression of the colors output by the image primitive generators can be more easily performed if the RGB or CIE XYZ values of the colors are first converted to the YES coordinate system, Such conversion may take place in the image primitive generator 31, in the color examination device 32, or in a device (not shown) located between the image primitive generator 31 and the path to the color examination device 32. If the colors of the primitives to be output by the image primitive generator 31 are originally represented in the YES coordinate system, then the conversion to YES coordinates obviously need not be performed.

The YES coordinate system has been described in a color coding standard (i.e., the "Xerox Color Encoding Standard," XNSS 288811, Xerox Corporation (1989)) formulated by the Xerox Corporation of Stamford, Conn. The YES coordinate values that represent the colors of the source image can be determined from the RGB coordinates of the source image in accordance with the following equations;

$$Y = 0.253R + 0.684G + 0.063B; \quad (1)$$

$$E = (R - G)/2; \quad (2)$$

and $$S = (R+G)/4 + B/2. \quad (3)$$

If the color coordinates output by the image primitive generator 31 are CIE XYZ values, then the following set of transformation equations would be applicable:

$$Y = Y; \quad (4)$$

$$E = 2.019X - 1.743Y - 0.246Z; \quad (5)$$

and $$S = 0.423X + 0.277Y - 0.831Z. \quad (6)$$

In the apparatus of FIG. 3, following the conversion of the output of the image primitive generator 31 into YES coordinates, the color examination section $32_b$ of the color examination device 32 examines and stores the source image in the image buffer 33 in the form of YES coordinates. At the same time, the color examination section $32_a$ of the color examination device examines the colors of the source image and stores the boundary of the source image gamut, represented in YES coordinates, in the source image gamut buffer 36.

Figure 5:
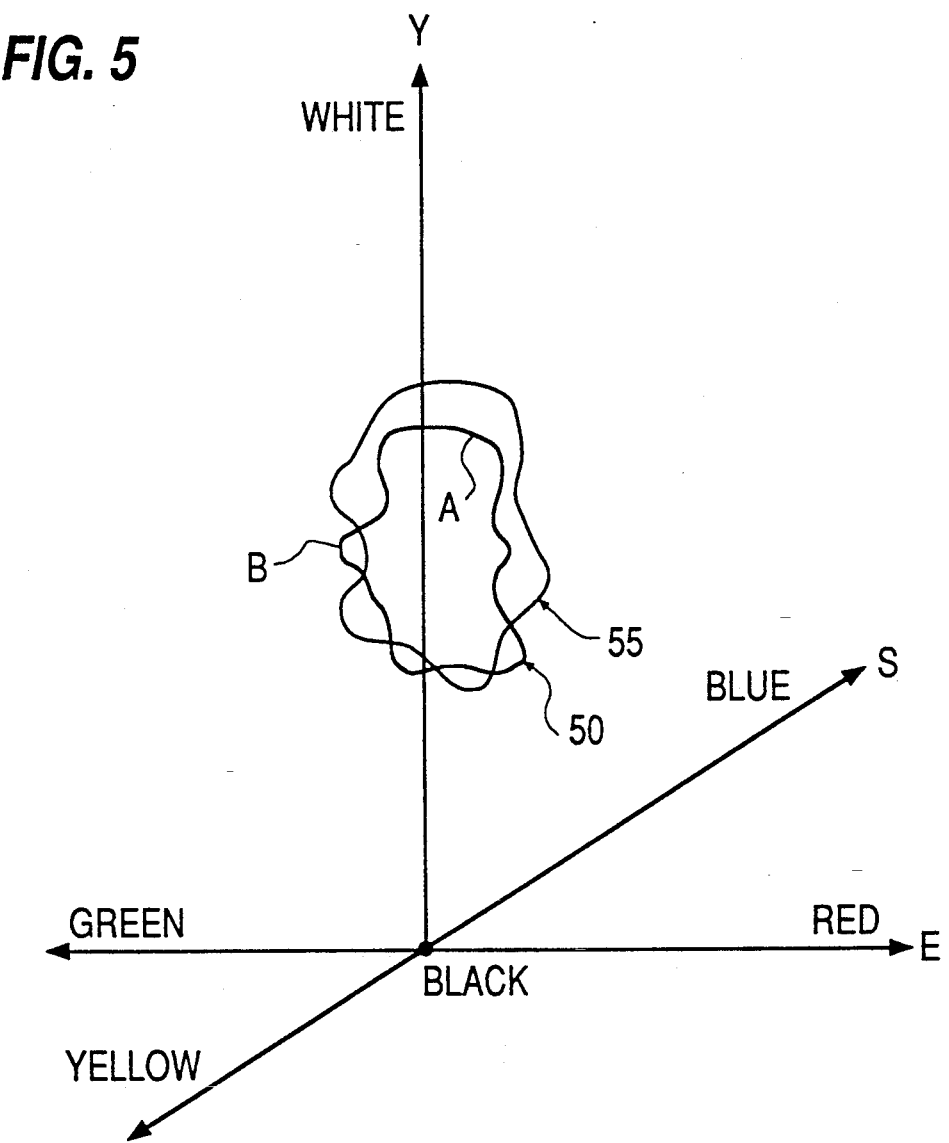
FIG. 5 is a schematic representation of a source image gamut and a printer gamut included within a YES color coordinate system.

FIG. 5 shows an example of a source image gamut 50 and a printer gamut 55 represented in the YES coordinate system. In the YES coordinate system, the Y-axis represents luminance, the E-axis is the red-green axis, and the S-axis is the blue-yellow axis. As can be seen from FIG. 5, the boundary of the source image gamut 50 encompasses the YES color coordinates included in the source image constructed by the image primitive generator 31, while the boundary of the printer gamut 55 encompasses the colors which the image output device 35 is capable of reproducing. In FIG. 5, point A represents a color of the source image that is within the printer gamut 55, while point B represents a color of the source image that will have to be compressed or mapped so that it will fall within the printer gamut 55.

In a preferred embodiment of the present invention, an shown in FIG. 3, the boundary of the source image gamut can be stored in the source image gamut buffer 36 as a gamut representation addressed by color. A more efficient alternative method of storing the boundary of the source image gamut within the source image gamut buffer 36 (and also of storing the image output device gamut in the gamut buffer 40), however, entails representing the boundary of the source image gamut and the boundary of the image output device gamut in the source image gamut buffer 36 and the gamut buffer 40, respectively, as sets of saturation-related values within a plurality of index tables.

The aforementioned alternative method is carried out by the color examination device 32. Upon receipt of a source image color from the image primitive generator 31, the color examination section $32_a$ determines the YES coordinates representing the color, and a logarithm (e.g., to the base 10) of the absolute values of the E and S coordinates for the color. This process is performed for all of the colors of the source image, and the resulting values are used to determine compression factors used to perform color gamut compression in the YES coordinate system using cylindrical geometry. The color examination device 32 may also determine a logarithm (e.g., to the base 10) of the Y coordinate (or the logarithm of the absolute value of the Y coordinate) for each color in order to make the distribution of the source image colors more visually uniform.

The logarithm of the absolute value of the E coordinate of each color and the logarithm of the absolute value of the S co-ordinate of each color are determined by the color examination device 32 as follows:

$$l_e = \text{sign}(E) \, (A \log (\max (|E|, N)) + B); \quad (7)$$

and $$l_s = \text{sign}(S) \, (A \log (\max (|S|, N)) + B); \quad (8)$$

where $l_e$ = the logarithm of the absolute value of the E coordinate;

$l_s$ = the logarithm of the absolute value of the S coordinate;

sign(E) = the sign (+ or −) of the E coordinate;

sign(S) = the sign (+ or −) of the s coordinate;

max ($|E|$, N) = the higher of $|E|$ and N;

max ($|S|$, N) = the higher of $|S|$ and N; and

A, B and N are constants which describe the domain of the E and S values and the range of the $l_e$ and $l_s$ values.

Constants A and B are, respectively, the scaling and offset constants (e.g., 60 and 2.1, respectively) for spreading out the $l_e$ and $l_s$ ranges. Constant N is a non-zero cutoff value (e.g., 0.0078125) for preventing determination errors in situations where the E or S coordinate values pass through (i.e., are equal to) zero. The constants A, B and N may be determined based on the input and output ranges of equations (7) and (8). For example, constants A, B, and N have values of 60, 2.1 and 0.0078125, respectively, when the range of the values of input E (or input S) is −1 to +1, and the desired range of values for output $l_e$ (or output $l_s$, if the S coordinate is the input) is −128 to +127. The color examination device 32 preferably performs conversion from E to $l_e$ and conversion from S to $l_s$ by using a look-up table.

Figure 6:
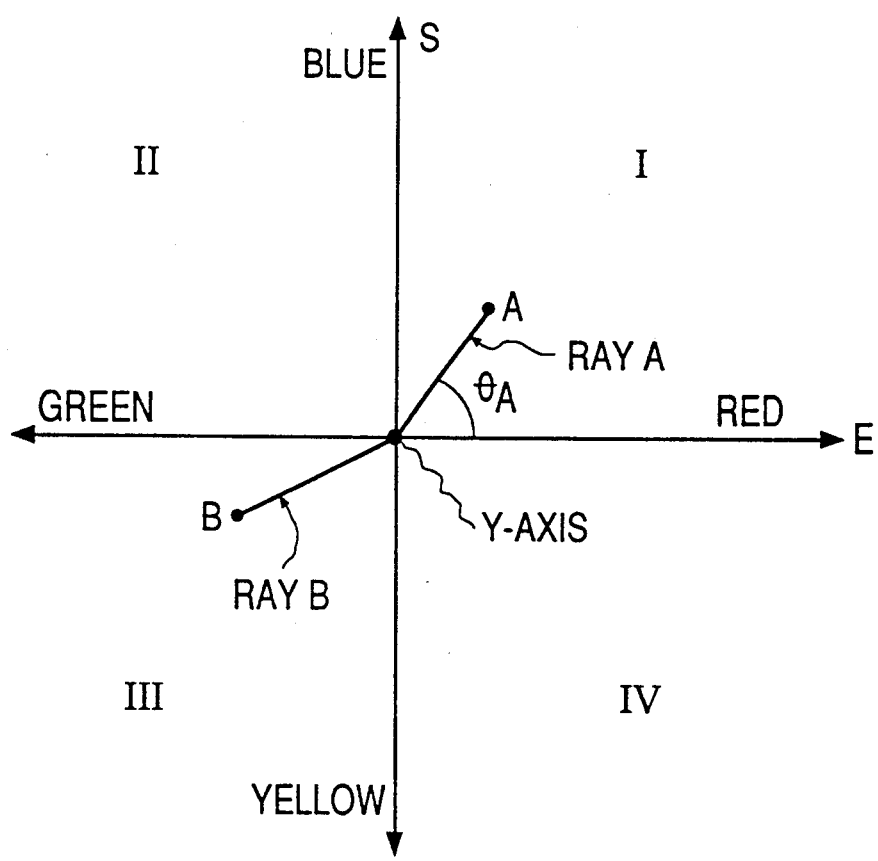
FIG. 6 is a view from along the Y-axis of the YES coordinate system illustrated in FIG. 4.

FIG. 6 is a view of the source image gamut points A and B from along the Y-axis of the YES coordinate system illustrated in FIG. 5. Following the determination of the $l_e$ value and the $l_s$ value for the color coordinate of each source image color, the color examination device 32 uses the $l_e$ and $l_s$ values to establish an index table in the source image gamut buffer 36 for each of the quadrants I, II, III and IV shown in FIG. 6. In FIG. 6, point A of the source image gamut 50 of FIG. 5 is included within quadrant I, while point B of the source image gamut 50 of FIG. 5 is included within quadrant III.

The four quadrants are designated by the four possible sign combinations of sign(E) and sign(S). For example if a source image color has a negative sign(E) value and a positive sign(S) value (i.e., if the E value for that color is negative and the S value for that color is positive), then it is known that the color coordinate for that color lies in quadrant IT. Since the four possible sign combinations of sign(E) and sign(S) respectively represent the four quadrants shown in FIG. 6, the color examination device 32 may generate the index tables for the four quadrants by generating an index table for each of the four possible sign combinations of sign(E) and sign(S), respectively.

FIG. 7 is a top portion of an index table corresponding to one of the quadrants. The index table for each quadrant is a list or table of the absolute values of the $l_e$ coordinates (i.e., the $|l_e|$ values) of source image colors occurring within that quadrant, with each $|l_e|$ value being indexed or pointed to by a corresponding H, Y index. Rather than storing all of the $|l_e|$ values corresponding to each H, Y index, the index table for each quadrant stores only the maximum $|l_e|$ value corresponding to each A, Y index of the quadrant. For ease of explanation, FIG. 7 only shows a top portion of the index table (i.e., a typical index table would include many more than four $|l_e|$ values).

The relationship between the H, Y and $|l_e|$ values of each color will now be discussed with reference to FIG. 8, which shows point A of the source image gamut 50 of FIG. 5 as represented in the YES coordinate system using cylindrical geometry. As indicated previously, point A occurs within quadrant I of FIG. 6. Accordingly, the $|l_e|$ value calculated for point A will be stored in the index table set up for quadrant I.

Figure 8:
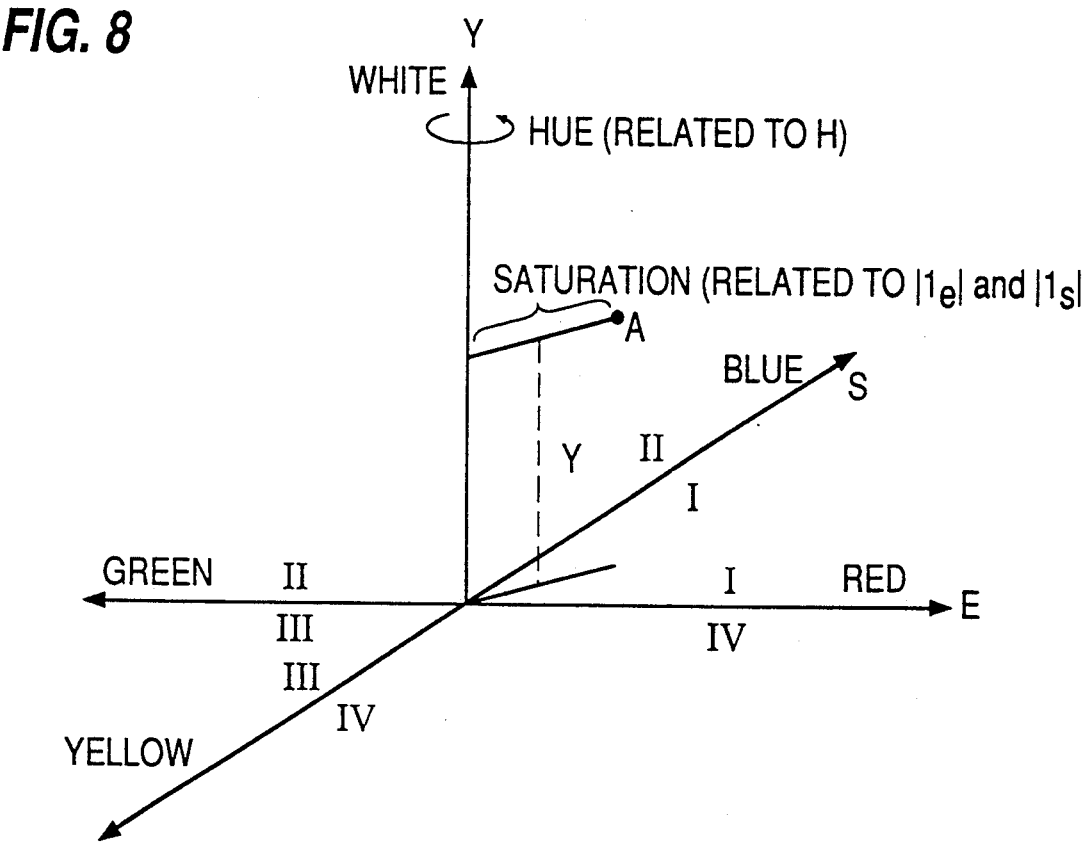
FIG. 8 is an illustration of a color space coordinate represented in the YES coordinate system using cylindrical geometry.

With reference to FIG. 8, the $|l_e|$ value for a color having point A as its color coordinate can be used as a measure of the amount the color is saturated (i.e., it is related to the length of the horizontal ray extending from the Y-axis to the color coordinate of the color). More particularly, the $|l_e|$ value for the color having point A as its color coordinate increases as the length of the horizontal ray extending from the Y-axis to point A increases. The R value for the color having point A as its color coordinate can be used to measure the hue of the color (i.e., the H value is related to the angular inclination around the Y-axis of the horizontal ray, which represents hue). The Y value of the color having point A as its color coordinate is the luminance or gray level of the color (i.e., the height of the color coordinate of the color above the origin of the YES coordinate system along the Y-axis).

Referring back to FIG. 7, the $|l_e|$ values stored in the index table for each quadrant are indexed by the H and Y values determined by the color examination device 32. In another embodiment of the invention, the $|l_e|$ values may be indexed by the H values only. In yet another embodiment of the invention, the $\oplus l_e|$ value may be indexed by both the H value and a function of the Y value, such as the logarithm of the Y value.

As indicated previously, the length of the horizontal ray extending from the Y-axis to the color coordinate of a given color represents the amount that the color is saturated. The color mapping of a source image color, performed to compress the color gamut of the source image, entails shortening the ray associated with the color (i.e., shrinking the saturation of the color) to bring the color coordinate of the color within the image output device gamut. As the $|l_e|$ coordinate and the $|l_s|$ coordinate for a given color can be used to measure the length of the ray associated with the color (i.e., how saturated the color is), the ray for a given color is shortened by decreasing the magnitude of the $|l_e|$ value and the $|l_s|$ value associated with the color.

The H, Y indices for a given quadrant are determined in the color examination device 32 by determining the H and Y values for each color of the source image located within the quadrant. The Y value for a given color, as indicated previously, in merely the gray level or Y coordinate of that color. Thus, the Y value, or a function of the Y value such as the logarithm, may be used as the Y value of the H, Y index. The H value of the Hp Y index for each color is determined by the color examination device 32 as follows:

$$H = |l_e| - |l_s|; \qquad (9)$$

where

H is related to the hue of one of the source image colors;

$|l_e|$ = the absolute value of the $l_e$ coordinate associated with the color; and $|l_s|$ = the absolute value of the $l_s$ coordinate associated with the color.

The H value of each color within a given quadrant is equal to the logarithm of the tangent of the angle between the ray extending horizontally from the color coordinate of the pixel to the Y-axis, and one of the S and E axes bordering the quadrant. For example, in FIG. 6, the H value associated with point A, which is the color coordinate of one of the source image colors, is equal to the logarithm (e.g., to the base 10) of the tangent of angle $\theta_A$. By determining the H and Y values for each color of the source image in each quadrant, and the $|l_e|$ value for each color, the color examination device 32 constructs an index table in the source image gamut buffer 36 that is made up of portions similar to the index table portions shown in FIG. 7 for each quadrant. The index table for each quadrant is a list of the $|l_e|$ values of colors in the quadrant, indexed by both R and Y values. In the described embodiment, the H and Y values are quantized to give a manageable table size.

In a preferred embodiment, the color examination device 32 stores, in source image gamut buffer 36, only the highest $|l_e|$ value for each M, Y index in the index table for each quadrant. Accordingly, each M, Y index stored in the source image gamut buffer 36 only points to a single $|l_e|$ value in the index table, and the $|l_e|$ pointed to by each R, Y index is the highest $|l_e|$ value that has been recorded for that H, Y index. Because the index tables each store only a maximum $|l_e|$ value corresponding to each H, Y index, rather than all of the $|l_e|$ values corresponding to each H, Y index, the amount of memory required to store the index tables is decreased. The maximum $|l_e|$ values represent the boundary of the source image gamut.

The storage of only the highest $|l_e|$ value for each H, Y index can be carried out by the color examination device 32 in accordance with the following "if-then" statement:

if Table[H, Y] < $|l_e|$, then Table[H, Y] = $|l_e|$;

where

Table[H, Y] = a current $|l_e|$ value that is stored in one of the index tables and indexed by a value H and a value Y;

and $|l_e|$ = the potential replacement of Table[H, Y].

In accordance with this "if-then" statement, the color examination device 32 compares each now $|l_e|$ value for a given H, Y index with a currant $|l_e|$ value (i.e., Table[H, Y]), and if the new $|l_e|$ value is greater than the current $|l_e|$ value, then the current $|l_e|$ value indexed by [H, Y] in the source image gamut buffer 36 is changed to be the new $|l_e|$ value. In this manner, the color examination device 32 sets each index table to include only the highest $|l_e|$ value occurring for each H, Y index pointing to the index table.

In another embodiment, the source image gamut buffer 36 stores the highest $|l_s|$ value for each H, Y index. In yet another embodiment, the source image gamut buffer 36 stores, as the values of the index table for each quadrant, the higher of $|l_e|$ and $|l_s|$ for each H, Y index. In yet another embodiment, the source image gamut buffer 36 stores the highest $|l_e|$ value for certain H, Y indices within a given quadrant, and stores the highest $|l_s|$ value for the remaining H, Y indices in that quadrant.

In general, it in desirable to store, in the index table for each quadrant, information indicating the maximum saturation corresponding to each H, Y index. As the saturation of a given color corresponds to the length of the ray extending from the Y-axis to the color coordinate of the color, the information stored in the index table of each quadrant should identify the longest ray for each H, Y index of the quadrant. In other words, each index table should indicate the maximum saturation occurring for each H, Y index that points to the index table.

The conversion to Y, $l_e$ and $l_s$ coordinates facilitates the determination of the four index tables representing the source image gamut. The four index tables together constitute a source image gamut table stored in the source image gamut buffer 36 and representing the boundary of the source image gamut.

The gamut comparison device 37 uses the source image gamut table stored in the source image gamut buffer 36 to compare the boundary of the source image gamut with the boundary of the image output device gamut. More particularly, the gamut comparison device 37 uses the source image gamut table that has been stored in the source image gamut buffer 36 to compare the boundary of the source image gamut, represented by the maximum $|l_e|$ values of the source image gamut, against the boundary of the image output device gamut, represented by the maximum $|l_e|$ values of the image output device gamut), to determine the appropriate compression factors to be used in the mapping of the colors of the source image stored in the image buffer 33. If the image output device gamut boundary is described by a table similar to the source image gamut table (e.g., by a table made up of index tables that each include saturation-related values indexed by both H and Y values), than the differences between the corresponding values of the source image gamut table and the image output device gamut table represent the extent to which the source image gamut must be compressed in order to fit within the image output device gamut. In particular, the differences between corresponding source image gamut table values and image output device gamut table values respectively, provide the logarithms of the values by which the saturation-related values of the source image (e.g., the $|l_e|$ values of the source image) differ from those capable of being reproduced by the image output device 33.

Differences F[H, Y] between corresponding values from the source image gamut table and the image output device gamut table are determined by the gamut comparison device 37 in accordance with the following equation:

$$F[H, Y] = \max(0, \text{Table}[H, Y] - \text{PrinterTable}[H, Y]); \quad (10)$$

where

Table[H, Y] = the current $|l_e|$ value, in one of the index tables constituting the source image gamut table, that is indexed by a value H and a value Y;

PrinterTable[H, Y] = the current $|l_e|$ value, in the image output device gamut table, indexed by the value H and the value Y;

max (0, Table[H, Y] − PrinterTable[H, Y]) = the higher of 0 and Table[H, Y] − PrinterTable[H, Y]; and F[H, Y] = the logarithm (e.g., to the base 10) of the factor by which the $|l_e|$ value corresponding to the value Table[H, Y] differs from the $|l_e|$ value corresponding to the value PrinterTable[H, Y].

After the gamut comparison device 37 determines the F[H, Y] value for each H, Y index in the source image gamut table, the color mapping device 34 uses the F[H, Y] values to map (i.e., compress) the source image stored in the image buffer 33 so that all of the colors of the source image fall within the image output device gamut, as will be described below in detail. The F[H, Y] values are stored by the gamut comparison device 37 within the color mapping buffer 41 so that the colors of the source image can be mapped by the color mapping device 34 at the same time the source image is read from the image buffer 33 to the image output device 35 (i.e., after the first pixel of the source image is read from the image buffer, but before the last pixel is received by the image output device).

The F[H, Y] values are stored in the color mapping buffer 41 by the gamut comparison device 37 in the form of a color mapping table. Like the saturation values stored in the portions of the index tables illustrated in FIG. 7, the F[H, Y] values stored in the color mapping table of the color mapping buffer 41 are each indexed by a corresponding H, Y index. A portion of a typical color mapping table including F[H, Y] values indexed or pointed to by H, Y indices is show in FIG. 9.

A smoothing operation may ba applied to the color mapping table stored in the color mapping buffer 41 so that the F[H, Y] values stored in the color mapping table do not vary a great amount from one H, Y index to the next. For example, if only one of the F[H, Y] values for a given H, Y index in the color mopping table is small (e.g., near zero), and the F[H, Y] values associated with other nearby H, Y indices are large, it may be desirable to increase the small F[H, Y] value of the color mapping table so that it corresponds more closely to the magnitude of the other F[H, Y] values.

The details of how the color gamut of the source image is actually compressed by the color mapping device 34, using cylindrical geometry, will now be discussed. As indicated previously, the source image gamut compression or color mapping performed by the color mapping device 34 entails decreasing the $|l_e|$ and $|l_s|$ values associated with each source image color having a color coordinate outside the printer gamut until all of the color coordinates of the source image gamut fall within the color gamut of the image output device.

To compress a source image color (i.e., to decrease the $|l_e|$ and $|l_s|$ values associated with the source image color) using cylindrical geometry, the color mapping device 34 determines the H, Y index for the source image color, and performs a look-up function in the color mapping table stored in the color mapping buffer 41 using the H, Y index. The look-up function is performed to select which F[H, Y] value in the color mapping table is to be subtracted from each of the $|l_e|$ and $|l_s|$ values of the source image color to be compressed. The color mapping device 34 subtracts the selected F[H, Y] value from each the $|l_e|$ and $|l_s|$ values of the source image color to be compressed to "desaturate" the source image color as described below.

To desaturate (i.e., to decrease in saturation) each source image color associated with a given E, Y index to the same degree, the color mapping table 34 subtracts the F[H, Y] value selected for that H, Y index from the $|l_e|$ and $|l_s|$ values of each of the source image colors associated with the H, Y index. In other words, the color mapping device 34 subtracts the same F[H, Y] value from the $|l_e|$ and $|l_s|$ values of each source image color designated by the given H, Y index. The color mapping device 34 performs these subtractions in accordance with the following equations (11) and (12):

$$|l_{e'}| = \max(0, |l_e| - F[H, Y]); \quad (11)$$

where $\max(0, |l_e| - F[H, Y]) = $ m the higher of 0 and $|l_e| - F[H, Y]$;

$|l_e| = $ the $|l_e|$ value of the color from the image buffer 33 that is being compressed;

F[H, Y] = the compression factor in the color mapping table having the same H, Y index as $|l_e|$; and $|l_{e'}| = $ the $|l_e|$ value of the color after the gamut compression is performed by the color mapping device 34.

$$|l_{s'}| = \max(0, |l_s| - F[H, Y]); \quad (12)$$

where $\max(0, |l_s| - F[H, Y]) = $ the higher of 0 and $|l_s| - F[H, Y]$;

$|l_s| = $ the $|l_s|$ value of the color from the image buffer 33 that is being compressed;

F[H, Y] = the compression factor in the color mapping table having the same H, Y index as $|l_s|$; and $|l_{s'}| = $ the $|l_s|$ value of the color after the gamut compression is performed by the color mapping device 34.

To limit the amount of saturation which takes place to a certain value (e.g., a value M), the following equations (13) and (14) may be used by the color mapping device 34 in place of equations (11) and (12), respectively:

$$|l_{e'}| = \max(0, |l_e| - \min(F[H, Y], M)); \quad (13)$$

and $$|l_{s'}| = \max(0, |l_s| - \min(F[H, Y], M)); \quad (14)$$

where $\max(0, |l_e| - \min(F[H, Y], M)) = $ the greater of 0 and $|l_e| - \min(F[H, Y], M)$;

$\max(0, |l_s| - \min(F[H, Y], M)) = $ the greater of 0 and $|l_s| - \min(F[H, Y], M)$;

$\min(F[H, Y], M) = $ the lesser of M and F[H, Y]; and $|l_{e'}|$, $|l_e|$, $|l_{s'}|$, $|l_s|$ and F[H, Y] are the same variables as those similarly designated in equations (11) and (12).

In this manner, the color mapping device 34 can control the compression of the source image gamut so that no source image color is desaturated beyond the degree determined by the value of M (e.g., 50). The value M may vary from H, Y index to H, Y index, or it can be constant for each compression factor stored in the color mapping table of the color mapping buffer 41. Like constants A, B and N from equations (7) and (8), the value M in determined based on the input and output ranges of the equation or equations in which it used.

By varying the amount of desaturation applied to the source image pixel color as a function of the $|l_e|$, $|l_s|$ and F[H, T] values, the color mapping device 34 can compress highly saturated colors differently (i.e., to a different degree) than the source image colors that are not highly saturated. In other words, the color mapping device 34 can compress source image colors having higher-magnitude $|l_e|$ and $|l_s|$ values to a greater degree than the source image pixel colors having lower-magnitude $|l_e|$ and $|l_s|$ values.

The aforementioned desaturation variation can be carried out by the color mapping device 34 using a desaturation function defined in a desaturation table (e.g., a desaturation table (not shown) stored, for example, in the color mapping table 41). The values in the desaturation table are each indexed by the sum of (i) a corresponding one of the compression factors F[H, Y]; and (ii) a corresponding maximum $|l_e|$ or $|l_s|$ value. If the desaturation table is used, then the compression equations (11) and (12) used by the color mapping device 34 are replaced by the following equations (15) and (16), respectively:

$$|l_{e'}| = \max(0, |l_e| - D\{F[H, Y] + \max(|l_e|, |l_s|)\}); \quad (15)$$

and $$|l_{s'}| = \max(0, |l_s| - D\{F[H, Y] + \max(|l_e|, |l_s|)\}); \quad (16)$$

where $\max(0, |l_e| - D\{F[H, Y] + \max(|l_e|, |l_s|)\}) = $ the higher of 0 and $|l_e| - D\{F[H, Y] + \max(|l_e|, |l_s|)\}$;

$\max(0, |l_s| - D\{F[H, Y] + \max(l_e|, |l_s|)\}) = $ the higher of 0 and $|l_s| - D\{F[H, Y] + \max(|l_e|, |l_s|)\}$;

$D\{F[H, Y] + \max(|l_e|, |l_s|)\} = $ the desaturation value from the desaturation table indexed by F[H, Y] and $\max(|l_e|, |l_s|)$; and $|l_{e'}|$, $|l_{s'}|$, $|l_e|$, $|l_s|$, and F[H, Y] are the same variables an those similarly designated in equations (11) and (12).

By using equations (15) and (16), the color mapping device 34 can vary the amount of desaturation based on the degree to which each of the colors of the source image is saturated. In this manner the farther out a source image color coordinate is from the Y-axis (i.e., the more saturated the color of the source image is), and the greater the distance the source image color coordinate is from the boundary of the image output device gamut, the more the $|l|$ and $|l_s|$ values of the color coordinate will be decreased or compressed by the color mapping device 34.

After the various colors of the source image are mapped or compressed by the color mapping device 34, the compressed values are output by the color mapping device to the image output device 35 for printing (or if image output device 35 is a device such &w a CRT, for display). As indicated previously, the compression or mapping performed by the color mapping device 14 is carried out at the same time the source image is read out from the image buffer 33.

In a preferred embodiment, the gamut comparison device 37 constructs the color mapping table in the color mapping buffer 41 by storing, in the color mapping table, F[H, Y] values for only certain ones of the M, Y indices of the source image gamut table stored in the source image gamut buffer 36. In order to compress a source image color from the image buffer 33 that does not have the same index as one of the F[H, Y] values in the color mapping table, the color mapping device 34 performs an interpolation to determine an appropriate F[H, Y] value to be subtracted from the $|l_e|$ and $|l_s|$ values of that source image color. The interpolation performed for a given source image color is carried out by the color mapping device 34 using the F[H, Y] values in the color mapping table that are indexed by H, Y indices corresponding to colors of the source image from buffer 33 that are close to the given source image color. The advantage of this method is that, due to the interpolation function, the color mapping table stored in the color mapping buffer 41 need not include an F[H, Y] value for each individual color of the source image.

In yet another embodiment, the gamut comparison device 37 constructs the color mapping table in the color mapping buffer 41 by storing, in the color napping table, F[H, Y] values for each H, Y index of the source image gamut table stored in buffer 36. In other words, unlike the previous embodiment, the color mapping table includes all of the F[H, Y] values that will be required to compress the source image stored in the image buffer 33, so that the performance of interpolation by the color mapping device 34 will not be required to determine the remaining F[H, Y] values. Because the color mapping table includes F[H, Y] values for each index of the source image gamut table, the color mapping device 34 may subtract F[H, Y] values from the $|l_e|$ and $|l_s|$ values for each of the color of the source image stored in the image buffer 33, at the same time that the source image is being read from the image buffer 33, without requiring interpolation.

In either of the aforementioned color mapping embodiments, the color examination device 32 may store the colors of the source image in the image buffer 33 as YES coordinates, Y, $l_e$, $l_s$ coordinates, absolute values of such coordinates, or in some other form. However, it has been found that maintaining the source image colors in Y, $l_e$, $l_s$ form in the image buffer 33 is particularly useful for facilitating gamut compression determinations using the embodiment not requiring interpolations.

The previous discussion has been directed to explaining how the source image color gamut can be compressed in the YES coordinate system using cylindrical geometry. However, the gamut compression performed by the system shown in FIG. 3 can also be carried out in the YES coordinate system using spherical geometry. An embodiment which compresses the color gamut of a source image in the YES coordinate system using spherical geometry rather than cylindrical geometry will now be discussed.

As in the above-described cylindrical geometry compression embodiments, the color space coordinates output by image primitive generator 31, if not already in YES coordinate form, are converted into YES coordinates and examined by the color examination device 32 at the same time that the source image is stored in the Image buffer 33 (and at the same time the boundary of the source image gamut is being stored in the source image gamut buffer 36).

In examining the source image, the color examination section 32$_a$ of the color examination device 32 determines the logarithms (e.g., to the base 10) of the absolute values of the E and S coordinates for each color of the source image using equations (7) and (8). As in the cylindrical geometry embodiments, the $|l_e|$ and $|l_s|$ values for a given color coordinate can be used to measure the degree to which the color represented by the color coordinate is saturated.

Figure 10:
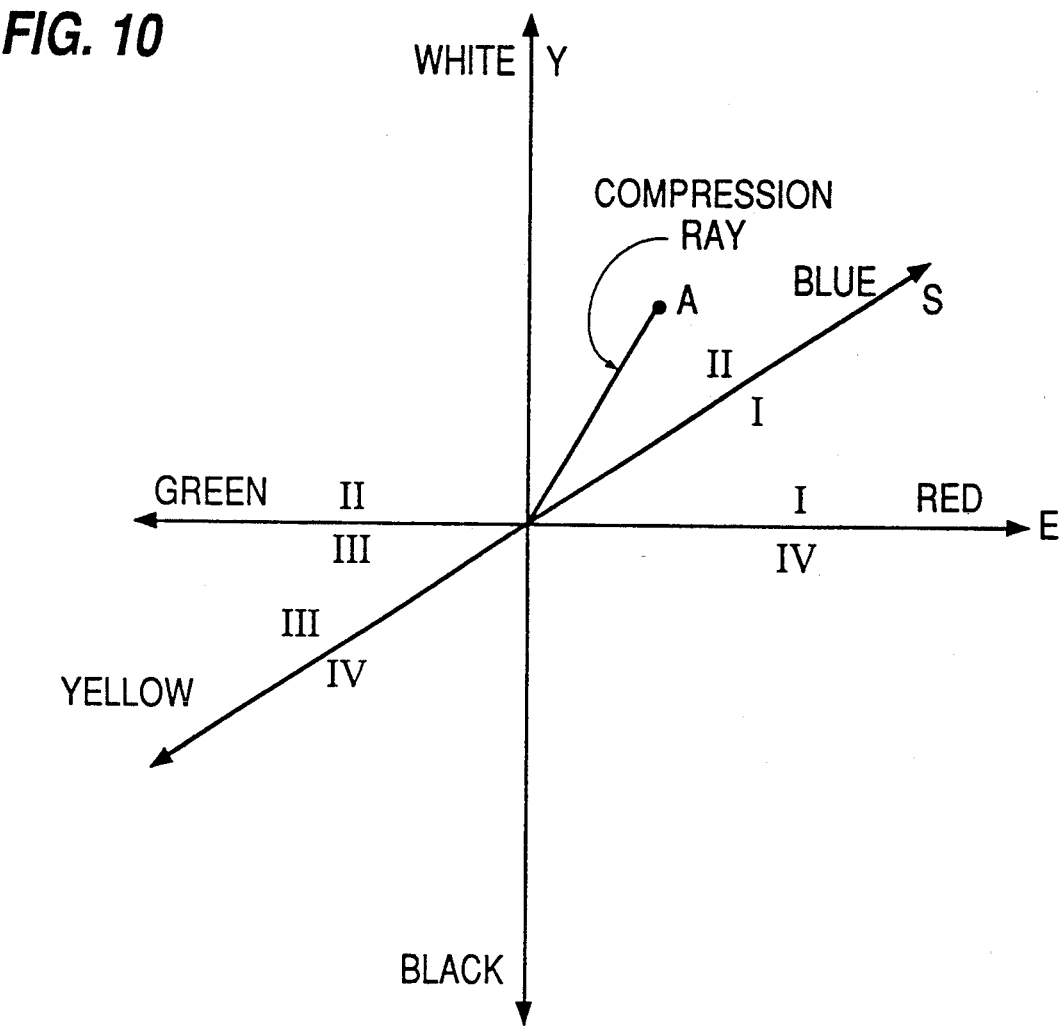
FIG. 10 is an illustration of a color space coordinate represented in the YES coordinate system using spherical geometry.

With reference to FIG. 8, the compression ray associated with a given color coordinate (e.g., a point A) represented using cylindrical geometry is always horizontal, and extends to the color coordinate from the point on the Y-axis corresponding to the Y value (i.e., the luminance) of the color coordinate. However, as can be seen from FIG. 10, the compression ray associated with the color coordinate (e.g., point A) represented using spherical geometry is not always horizontal, but rather extends to the color coordinate from a single point on the Y-axis that is unrelated to the luminance or Y value of the color coordinate. Thus, color gamut compressions carried out using spherical geometry in the YES coordinate system are not always performed along a horizontal ray as in the cylindrical geometry embodiments, although in some circumstances they may be.

In the spherical geometry embodiment, after the $|l_e|$ and $|l_s|$ values are determined, the logarithm of the absolute value of (Y−C) is determined by the color examination device 32 in accordance with the following equation:

$$l_y = \text{sign}(Y-C) \, (A \log (\max (|Y-C|, N)) + B); \quad (17)$$

where
$l_y$ = the logarithm of the absolute value of the Y coordinate decreased by a constant C;
sign(Y−C) = the sign (+ or −) of the Y coordinate decreased by the constant C;
max ($|Y-C|$, N) = the higher of $|Y-C|$ and N;
C is a constant (e.g., 0.5) by which Y is decreased; and
A, B and N are constants which describe the domain of the Y value and the range of the $l_y$ value.

Similar to equations (7) and (8), constants A and B are, respectively, the scaling and offset constants (e.g., 60 and 2.4082, respectively) for spreading out the $l_y$ range. Also, similar to equations (7) and (8), constant N is a non-zero cutoff value (e.g., 0.0078125) for preventing determination errors in situations where the (Y−C) value passes through (i.e., is equal to) zero. The constants A, B and N may be determined based on the input and output ranges of equation (17). For example, constants A, A, and N have values of 2.4082, 2.1 and 0.00390625 when the range of the values of input Y is −0.5 to +0.5, and the desired range of values for output $l_y$ is −128 to +127. The color examination device 32 preferably performs conversion from the value of Y to $l_y$ by using a look-up table.

The logarithm of tho absolute value of (Y−C) is determined instead of just the logarithm of the absolute value of Y in order to center the compression sphere at a specified gray level. More particularly, an shown in FIG. 10, the logarithm of $|Y-C|$ is used instead of just $|Y|$ in order to designate the point on the Y-axis from which all of the compression rays for the pixel color coordinates will extend In accordance with the value of tho constant C. if the range of T is 0 to 256, and C is selected to be 128, then the compression sphere will be centered at a 50% gray level. Likewise, if the range of Y is 0 to 1, the center of the compression sphere may be centered at the 50% gray level by selecting the constant C to be 0.5. Other points along the Y-axis other than the 50% gray level may also be used as the center of the compression sphere by selecting different values for the constant C.

As in the cylindrical geometry embodiments, the H value is determined for each color using equation (9), and is used to index the saturation-related values (e.g., the $|l_e|$ values) of the source image gamut table stored in the buffer 36. However, rather than using the Y value as the other part of the index, a "W value" is determined and used instead. The W value can be used to measure the azimuthal angle associated with the compression ray extending from a point on the Y-axis to a given color coordinate representing a source image color, and is determined by the color examination device 32 in accordance with the following equation:

$$W = \max(|l_e|, |l_s|) - |l_y|; \qquad (18)$$

where
max $(|l_e|, |l_s|) - |l_y|$ = the higher of $|l_e|$ and $|l_s|$ decreased by a factor of $|l_y|$;
$|l_e|$ = the absolute value of the $l_e$ coordinate associated with the source image color;
$|l_s|$ = the absolute value of the $l_s$ coordinate associated with the source image color; and
$|l_y|$ = the absolute value of the $l_y$ coordinate associated with the source image color.

In addition to determining which quadrant the color coordinate of the source image color belongs to based on the sign(E) and sign(S) values, the color examination device 32 allay use the sign(Y−C) value to determine whether the color coordinate is located above or below a specified point (e.g., the 50% gray level), determined by the value of constant C, on the Y-axis of the YES coordinate system. The color examination device uses the above-described information for each source image color to generate a source image gamut table in the source image gamut buffer 36. The source image gamut table is a list of the saturation-related values (e.g., the $|l_e|$ values) for each color in the source image, indexed by the value H alone or, alternatively, by both the value H and the value W.

The saturation-related values stored in the source image gamut table may take the form of $|l_e|$, $|l_s|$, or $|l_y|$ value. In a preferred embodiment, the source image gamut table in buffer 36 stores the highest $|l_e|$ value for each H, W index. In yet another embodiment, the source image gamut table in buffer 36 stores the highest $|l_s|$ value for each H, W index. In still another embodiment, the source image gamut table in buffer 36 stores the highest $|l_y|$ value for each H, W index. In a further embodiment, the source image gamut table in buffer 36 stores, as the values of the source image gamut table, the highest of $|l_e|$, $|l_s|$ and $|l_y|$ for each H, W index.

The source image gamut table generated by the color examination device 32 is stored, by the color examination device, in the source image gamut buffer 36. The gamut comparison device 37 compares the source image gamut table with a similarly indexed printer gamut table stored in the image output device gamut buffer 40 in a manner similiar to the comparison performed in the cylindrical geometry compression embodiments. The results of this comparison are used by the gamut comparison device 31 to construct a color mapping tables including a lint Of gamut compression factors F[H, W], in the color mapping buffer 41. An example of a portion of a color mapping table constructed using spherical geometry is shown in FIG. 11. The color mapping device 34 uses the compression factors stored in the color mapping table, which are pointed to by H, W indices (like the saturation-related values stored in the source image and printer gamut tables), to decrease the $|l_e|$, $|l_s|$, and $|l_y|$ values of the source image at the same time that it is being read from the image buffer 33 to the image output device 35 by the color mapping device 34 (i.e., after the first pixel of the source image is read out from the image buffer 33, but before the last source image pixel is received by the image output device 35). More particularly, the color mapping device 34 subtracts the gamut compression factors from the $|l_e|$, $|l_s|$, and $|l_y|$ values of the source image at the same time that the source image is passing through the color mapping device 34.

In carrying out the spherical geometry compression method, it is preferable to store the source image in the image buffer 33 in the form of $|l_e|$, $l_s$ and $l_y$ coordinates, or as $|l_e|$, $|l_s|$ and $|l_y|$ coordinates. In this way, the compression factors stored in the color mapping table of color mapping buffer 41 can be applied directly to the source image for the purpose of decreasing the saturation values of the source image.

It should be noted that the variations discussed above in connection with the cylindrical geometry compression method are all applicable to the spherical geometry compression method. For example, a desaturation table stored in the color mapping buffer 41 could be used in the spherical geometry compression method for varying the amount of desaturation applied to the source image pixel colors based on the degree to which each of the pixel colors of the source image is saturated.

The foregoing description of the preferred embodiments of the present invention has been presented for purposes of illustration and description, it is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modification as are suited to the particular use contemplated. It is intended that the scope of the invention be defined by the claims appended hereto, and their equivalents.

I claim:

1. An image processing method, the method performed by a data processing system having a memory, and comprising the steps, performed by the data processing system, of:

storing, in the memory of the data processing system, a multi-pixel image to be output by an image output device, the multi-pixel image having colors of a first color gamut and the image output device being capable of outputting colors of a second color gamut;

reading the multi-pixel image from the memory for receipt by the image output device; and compressing the first color gamut of the multi-pixel image, after start of the reading step and before completion of the reading step, so that the colors of the multi-pixel image fit within the second color gamut of the image output device.

2. The image processing method of claim 1, further comprising the steps of:

analyzing the multi-pixel image, after start of the reading step and before completion of the reading step, to generate boundary information representing a boundary of the first color gamut; and storing the generated boundary information in the memory, after start of the reading step and before completion of the reading step, wherein the compressing step includes the step of mapping colors of the multi-pixel image in accordance with the generated boundary information stored in the memory.

3. The image processing method of claim 2, further comprising the steps of:

generating boundary information representing a boundary of the second color gamut;

storing the boundary information representing the boundary of the second color gamut in the memory;

comparing the boundary information of the first color gamut with the boundary information of the second color gamut; and constructing a color mapping table in the memory based on the comparison of the boundary of the first color gamut and the boundary of the second color gamut, wherein the color mapping table includes values representing differences between the boundary information of the first color gamut and the boundary information of the second color gamut, and the compressing step includes the step of mapping colors of the multi-pixel image in accordance with the values in the color mapping table.

4. The image processing method of claim 1, wherein the memory of the data processing system includes a first memory device for storing the multi-pixel image, and a second memory device, separated from the first memory device, for storing the boundary information representing the first color gamut.

5. An image processing apparatus, in a data processing system having a memory, comprising:

means for storing, in the memory of the data processing system, a multi-pixel image to be output by an image output device, the multi-pixel image having colors of a first color gamut and the image output device being capable of producing colors of a second color gamut;

means for reading the multi-pixel image from the memory for receipt by the image output device; and a gamut compression device for compressing the first color gamut of the multi-pixel image, after start of the reading by the reading means and before completion of the reading by the reading means, so that the colors of the multi-pixel image fit within the second color gamut of the image output device.

6. The image processing apparatus of claim 5, further comprising:

an analyzer for analyzing the multi-pixel image, after start of the reading by the reading means and before completion of the reading by the reading means, to generate boundary information representing a boundary of the first color gamut; and means or storing the generated boundary information in the memory, after start of the reading by the reading means and before completion of the reading by the reading means, wherein the compression carried out by the gamut compression device includes mapping colors of the multi-pixel image in accordance with the stored boundary information.

7. The image processing apparatus of claim 6, further comprising:

means for generating boundary information representing a boundary of the second color gamut;

means for storing the boundary information representing the boundary of the second color gamut in the memory;

a comparison device for comparing the boundary information of the first color gamut with the boundary information of the second color gamut; and means for constructing a color mapping table in the memory based on the comparison of the boundary of the first color gamut and the boundary of the second color gamut, wherein the color mapping table includes values representing differences between the boundary information of the first color gamut and the boundary information of the second color gamut, and the compression carried out by the gamut compression device includes mapping colors of the multi-pixel image in accordance with the values stored in the color mapping table.

8. The image processing apparatus of claim 5, wherein the memory of the data processing system includes a first memory device for storing the multi-pixel image, and a second memory device, separate from the first memory device, for storing the boundary information representing the first color gamut.

9. An image processing method, the method being performed by a data processing system having a memory, and comprising the steps, performed by the data processing system, of:

storing, in the memory of the data processing system, a multi-pixel image to be output by an image output device, the multi-pixel image having colors of a first color gamut, and the image output device being capable of outputting colors of a second color gamut;

constructing a color mapping table in the memory that includes a list of gamut compression factor, values of the first color gamut representing differences between boundaries of the first and second color gamuts; and modifying the multi-pixel image stored in the memory in accordance with the gamut compression factors in the color mapping table.

10. The image processing method of claim 9, wherein the constructing step includes indexing the list of gamut compression factors using values indicating hue characteristics of the first color gamut.

11. The image processing method of claim 9, wherein the constructing step includes indexing the list of gamut compression factors using values indicating hue characteristics of the first color gamut and values indicating luminance characteristics of the first color gamut.

12. The image processing method of claim 10, wherein the constructing step further includes:

constructing a first color gamut table in the memory, wherein the first color gamut table includes a list of saturation-related values indicating saturation characteristics of the first color gamut, and the saturation-related values are indexed by values indicating hue characteristics of the first color gamut;

constructing a second color gamut table in the memory, wherein the second color gamut table includes a list of saturation-related values indicating saturation characteristics of the second color gamut, and the saturation-related values of the second color gamut table are indexed by values indicating hue characteristics of the second color gamut;

determining differences between corresponding saturation-related values in the first and second color gamut tables; and storing the determined differences in the memory to form the list of gamut compression factor& included in the color mapping table.

13. The image processing method of claim 10, wherein the storing step comprises, storing the multi-pixel image in the memory of the data processing system as a set of YES coordinates.

14. The, image processing method of claim 10, wherein the constructing stop further includes performing a logarithmic conversion on values representing tue boundaries of the first and second color gamuts, and determining the gamut compression factors by determining differences between the logarithmically converted values of the first and second color gamuts.

15. An image processing apparatus, in a data processing system having a memory, comprising:

means for storing, in the memory of the data processing system, a multi-pixel image to be output by an image output device, the multi-pixel image having colors of a first color gamut, and the image output device being capable of outputting colors of a second color gamut;

means for constructing a color mapping table in the memory that includes a list of gamut compression factors representing differences between boundaries of the first and second color gamuts; and means for modifying the multi-pixel image stored in the memory in accordance with the gamut compression factors in the color mapping table.

16. The image processing apparatus of claim 15, wherein the constructing means indexes the list of gamut compression factors by using values indicating hue characteristics of the first color gamut.

17. The image processing apparatus of claim 16, further comprising:

means for constructing a first color gamut table in the memory, wherein the first color gamut table includes a list of saturation-related values indicating saturation characteristics of the first color gamut, and the saturation-related values are indexed by values indicating hue characteristics of the first color gamut;

means for constructing a second color gamut table in the memory, wherein the second color gamut table includes a list of saturation-related values indicating saturation characteristics of the second color gamut, and the saturation-related values of the second color gamut table are indexed by values indicating hue characteristics of the second color gamut;

means for determining differences between corresponding saturation-related values In the first and second color gamut tables; and means for storing the determined differences in the memory to form the list of gamut compression factors included In the color mapping table.

18. The image processing apparatus of claim 16, wherein the means for storing stores the multi-pixel image in the memory of the data processing system as a set of YES coordinates.

19. The image processing apparatus of claim 16, wherein constructing means performs a logarithmic conversion on values representing the boundaries of the first and second color gamuts, and determines the gamut compression factors by determining differences between the logarithmically converted values of the first and second color gamuts.

20. The image processing apparatus of claim 15, wherein the constructing means indexes the list of gamut compression factors using values indicating the hue characteristics of the first color gamut and values indicating luminance characteristics of the first color gamut.

* * * * *